(12) United States Patent
Hunt (10) Patent No.: US 10,615,657 B2
(45) Date of Patent: Apr. 7, 2020

(54) CALIBRATED SLIP DIRECT CURRENT (D C) MACHINE

(71) Applicant: Sam R Hunt, Auson, TX (US)

(72) Inventor: Sam R Hunt, Auson, TX (US)

(73) Assignee: MSSB MOTOR TECHNOLOGY, LLC, Abilene, TX (US)

( * ) Notice: Subject to any disclaimer, the term of this patent is extended or adjusted under 35 U.S.C. 154(b) by 281 days.

(21) Appl. No.: 15/002,168

(22) Filed: Jan. 20, 2016

(65) Prior Publication Data

US 2017/0207688 A1    Jul. 20, 2017

(51) Int. Cl.
*H02K 7/14* (2006.01)
*H02K 3/28* (2006.01)
*H02K 99/00* (2014.01)

(52) U.S. Cl.
CPC .............. *H02K 3/28* (2013.01); *H02K 99/20* (2016.11)

(58) Field of Classification Search
CPC ......... H02K 3/12; H02K 11/0068; H02K 3/28
See application file for complete search history.

(56) References Cited

U.S. PATENT DOCUMENTS

| 5,541,488 | A | * | 7/1996 | Bansal | G01P 3/48 318/801 |
| 5,982,067 | A | * | 11/1999 | Sebastian | B62D 5/0403 310/179 |
| 9,608,501 | B2 | * | 3/2017 | Yamaguchi | H02K 3/28 |
| 2011/0243793 | A1 | * | 10/2011 | Kalin | H02P 8/14 422/67 |

* cited by examiner

*Primary Examiner* — Karen Masih
(74) *Attorney, Agent, or Firm* — Brian K. Yost; Geoffrey A. Mantooth (57) ABSTRACT

A DC machine for connection to an electrical system may include a stator configured as a portion of the DC machine; a rotor configured as a portion of the DC machine being rotatable with respect to the stator; and a control circuit to control the rotor to allow the rotor to continuously slip with respect to the stator.

11 Claims, 10 Drawing Sheets

Figure 6
CALIBRATED SLIP
DIRECT CURRENT MACHINE

Figure 7
CALIBRATED SLIP
DIRECT CURRENT MACHINE

Figure 8
CALIBRATED SLIP
DIRECT CURRENT MACHINE

Figure 10

CALIBRATED SLIP DIRECT CURRENT (D C) MACHINE

FIELD OF THE INVENTION

The present invention relates to electrical machines and more particularly to a direct current (D C) machine.

BACKGROUND

A DC motor/generator (machine) is any of a class of electrical machines that converts direct current electrical power into mechanical power. The most common types rely on the forces produced by magnetic fields. Nearly all types of DC motors have some internal mechanism, either electromechanical or electronic, to periodically change the direction of current flow in part of the motor. Most types produce rotary motion; a linear motor directly produces force and motion in a straight line.

DC motors were the first type widely used, since they could be powered from existing direct-current lighting power distribution systems. A DC motor's speed can be controlled over a wide range, using either a variable supply voltage or by changing the strength of current in its field windings. Small DC motors are used in tools, toys, and appliances. The universal motor can operate on direct current but is a lightweight motor used for portable power tools and appliances. Larger DC motors are used in propulsion of electric vehicles, elevator and hoists, or in drives for steel rolling mills. The advent of power electronics has made replacement of DC motors with AC motors possible in many applications.

A coil of wire with a current running through it generates an electromagnetic field aligned with the center of the coil. The direction and magnitude of the magnetic field produced by the coil can be changed with the direction and magnitude of the current flowing through it.

A simple DC motor has a stationary set of magnets in the stator and an armature with one or more windings of insulated wire wrapped around a soft iron core that concentrates the magnetic field. The windings usually have multiple turns around the core, and in large motors there can be several parallel current paths. The ends of the wire winding are connected to a commutator. The commutator allows each armature coil to be energized in turn and connects the rotating coils with the external power supply through brushes. (Brushless DC motors have electronics that switch the DC current to each coil on and off and have no brushes.)

The total amount of current sent to the coil, the coil's size and what it's wrapped around dictate the strength of the electromagnetic field created.

The sequence of turning a particular coil on or off dictates what direction the effective electromagnetic fields are pointed. By turning on and off coils in sequence a rotating magnetic field can be created. These rotating magnetic fields interact with the magnetic fields of the magnets (permanent or electromagnets) in the stationary part of the motor (stator) to create a force on the armature which causes it to rotate. In some DC motor designs the stator fields use electromagnets to create their magnetic fields which allow greater control over the motor.

At high power levels, DC motors are almost always cooled using forced air.

Different number of stator and armature fields as well as how they are connected provide different inherent speed/torque regulation characteristics. The speed of a DC motor can be controlled by changing the voltage applied to the armature. The introduction of variable resistance in the armature circuit or field circuit allowed speed control. Modern DC motors are often controlled by power electronics systems which adjust the voltage by "chopping" the DC current into on and off cycles which have an effective lower voltage.

Since the series-wound DC motor develops its highest torque at low speed, it is often used in traction applications such as electric locomotives, and trams. The DC motor was the mainstay of electric traction drives on both electric and diesel-electric locomotives, street-cars/trams and diesel electric drilling rigs for many years. The introduction of DC motors and an electrical grid system to run machinery starting in the 1870s started a new second Industrial Revolution. DC motors can operate directly from rechargeable batteries, providing the motive power for the first electric vehicles and today's hybrid cars and electric cars as well as driving a host of cordless tools. Today DC motors are still found in applications as small as toys and disk drives, or in large sizes to operate steel rolling mills and paper machines. Large DC motors with separately excited fields were generally used with winder drives for mine hoists, for high torque as well as smooth speed control using thyristor drives. These are now replaced with large AC motors with variable frequency drives.

If external power is applied to a DC motor it acts as a DC generator, a dynamo. This feature is used to slow down and recharge batteries on hybrid car and electric cars or to return electricity back to the electric grid used on a street car or electric powered train line when they slow down. This process is called regenerative braking on hybrid and electric cars. In diesel electric locomotives they also use their DC motors as generators to slow down but dissipate the energy in resistor stacks. Newer designs are adding large battery packs to recapture some of this energy.

The brushed DC electric motor generates torque directly from DC power supplied to the motor by using internal commutation, stationary magnets (permanent or electromagnets), and rotating electrical magnets.

Typical brushless DC motors use one or more permanent magnets in the rotor and electromagnets on the motor housing for the stator.

A homopolar motor has a magnetic field along the axis of rotation and an electric current that at some point is not parallel to the magnetic field. The name homopolar refers to the absence of polarity change.

A permanent magnet PM motor does not have a field winding on the stator frame, instead relying on PMs to provide the magnetic field against which the rotor field interacts to produce torque. Compensating windings in series with the armature may be used on large motors to improve commutation under load. Because this field is fixed, it cannot be adjusted for speed control. PM fields (stators) are convenient in miniature motors to eliminate the power consumption of the field winding. Most larger DC motors are of the "dynamo" type, which have stator windings. Historically, PMs could not be made to retain high flux if they were disassembled; field windings were more practical to obtain the needed amount of flux. However, large PMs are costly, as well as dangerous and difficult to assemble; this favors wound fields for large machines.

There are three types of electrical connections between the stator and rotor possible for DC electric motors: series, shunt/parallel and compound (various blends of series and shunt/parallel) and each has unique speed/torque characteristics appropriate for different loading torque profiles/signatures

SUMMARY

A direct current machine for connection to an electrical system, and may include a stator configured as a portion of the direct current machine; a rotor configured as a portion of the direct current being rotatable with respect to the stator; and a control circuit to control the rotor to control a magnetomotive force (mmf) vector about the a face of the rotor.

The direct current machine may include a first winding group and a second winding group. The first winding group may include at least one first conductor and the second winding group includes at least one second conductor, and the first conductor and the second conductor may be configured in a stair step configuration from slot to slot.

The stair step configuration may include a first slot and a second slot, and the first slot and the second slot directly adjacent to the first slot includes both first conductor and the second conductor, and the difference in number between the first conductor in the first slot and the first conductor in the second slot is a single first conductor.

The difference between the second conductor in the first slot and the second conductor in the second slot may be a single second conductor.

The control circuit may include an angle generator to determine the angle of slip between the rotor and the stator.

The control circuit may include a magnitude generator to generate a magnitude of slip between the rotor and the stator.

The control circuit may include an angle summing circuit.

The control circuit may include a magnitude summing circuit.

The control circuit may include a first multiplier circuit to connect to the rotor.

The control circuit may include a second multiplier circuit to connect to the rotor.

The control circuit controls the rotor to control a magnitude of the magnetomotive force (mmf) vector about the face of the rotor, or about the face of the stator, or about the faces of the rotor and the stator.

The control circuit controls an angle of the magnetomotive force (mmf) vector about the face of the rotor, or about the face of the stator, or about the faces of the rotor and the stator.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

Figure 8:
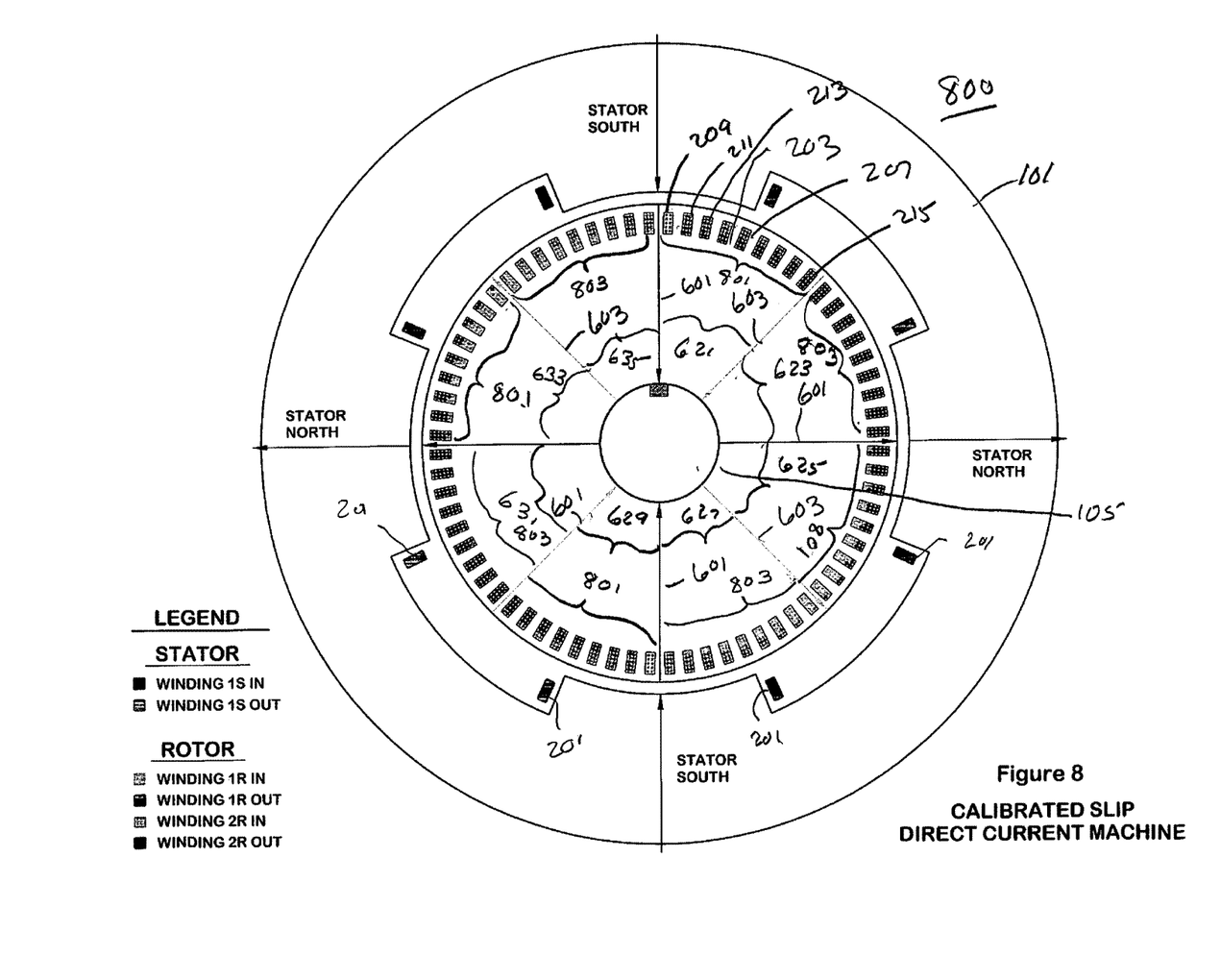
FIG. 8 illustrates a cross-sectional view of the stator and rotor of the calibrated slip Direct Current of the present invention.

A calibrated slip direct current machine of the present invention as shown in FIG. 8 may include two winding groups 203, 207 on the rotor 103 to positively control the magnitudes and angles of the magnetomotive force (mmf) vectors about the rotor face 103. The stator 101 of the calibrated slip DC machine 800 of the present invention may be the same as a conventional DC machine stator. As compared to a conventional direct current machine (not shown), the present invention, specifically DC machine 800, eliminates the need to mechanically commutate the rotor windings to achieve variable direct axes. The DC machine 800 may utilize a salient pole type of stator configuration for direct current machines. The DC machine may also utilize an additional winding group (not shown) in a round stator configuration about the stator 101 to positively control the magnitudes yet establish a fixed angle (fixed direct axes) of the magnetomotive force (mmf) vectors about the stator face. These two configurations should allow the machine 800 to be thermodynamically reversible (operate as a motor or generator depending on shaft torque with respect to shaft rotation) due to Lenz' Law.

The present invention may also include two or more winding groups 203, 207 about the stator to positively control the magnitudes and angles (variable direct axes) of the magnetomotive force (mmf) vectors about the stator face. This configuration allows the machine 800 to be operated in primarily motor mode.

The calibrated slip rotor can be also utilized.

Figure 1:
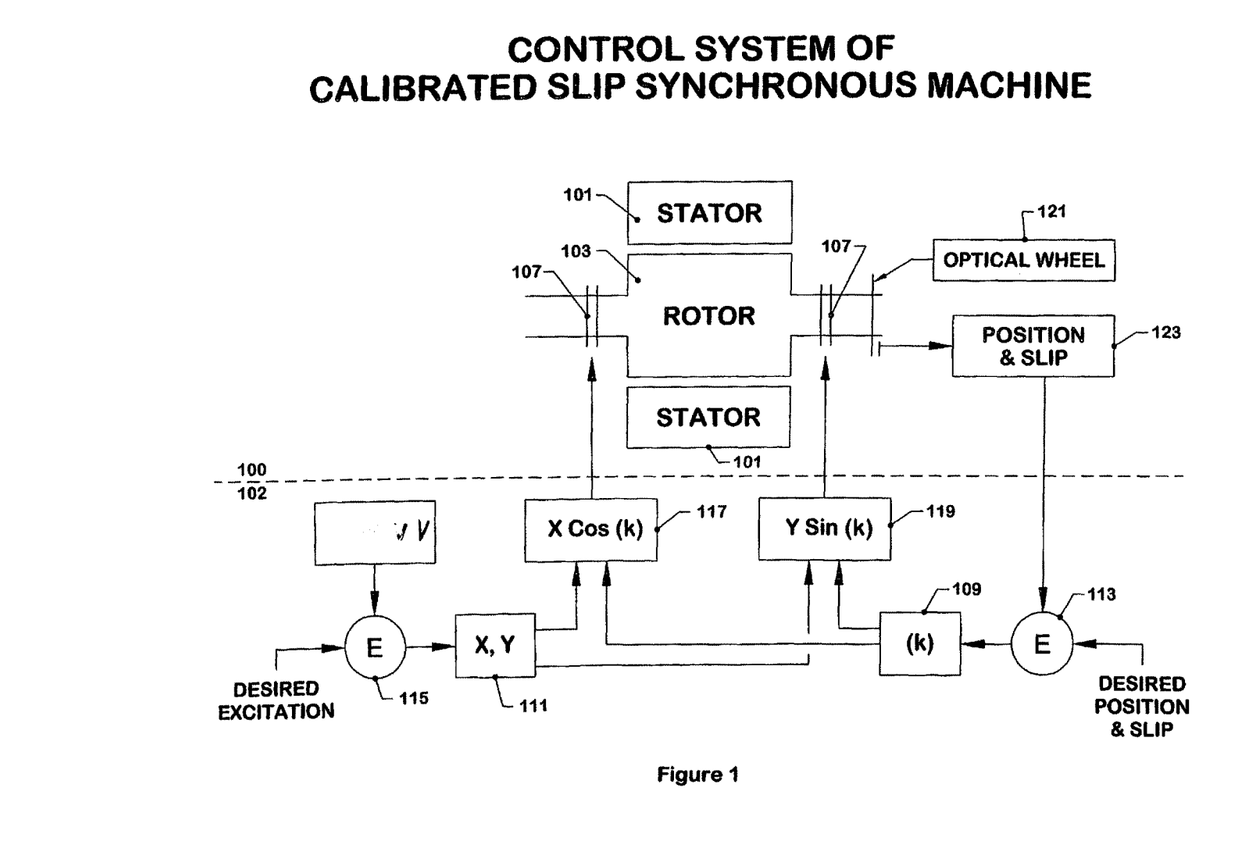
FIG. 1 illustrates a control system for a calibrated slip Direct Current machine of the present invention.

Specifically, the DC machine 800 of the present invention may include two winding (or more) 203, 207 distributed around the rotor face. Each winding 201, 205 may be energized by a dedicated set of slip rings 107 which may be connected to a control circuit 102 as shown in FIG. 1 to control the current of the first winding group 203 and the second winding group 207, more particularly the current within the first winding 201 and the second winding 205. Each winding 201, 205 may be positioned together in a single slot and positioned in a plurality of common slots in a stair step fashion where the change in number of the windings 201 of the first winding group 203 and the change in the number of the windings 205 of the second winding group 207 in adjacent slots may be increased (or decreased) of a single winding 201 of the first winding group 203 and a decrease (or increase) of a single winding 205 and a decrease of the second winding group 207, keeping the total number of windings 201, 205 within a single slot the same. The present invention is advantageous for the number of slots on the rotor 103 to be two times the number of poles times an odd integer that is greater than one. An advantage of the present invention is for the number of turns or the number of sets of turns in each slot is to be any integral multiple of this odd integer plus one (1). The two winding groups 203, 207 may be continuously stair stepped in the number of winding 201, 205 with respect to each other winding groups 203, 207 as you move from slot to slot around the rotor face. The present invention distributes an approximate sinusoidal mmf wave around the rotor for any given desired mmf pole position angle, additionally, the present invention makes it easier to mechanically balance the rotor. The sinusoidally distributed mmf wave transitions mostly the fundamental wave pattern of this sinusoidal magnetic field intensity from the rotor face into the air gap; however, due to Gauss' Law the magnetic flux intensity produced by the salient poles of the stator would redistribute the magnetic flux density patterns such that the transitioning flux becomes somewhat evenly concentrated at the stator pole faces. The present invention may soften the torque characteristics of this machine making it adaptable to loads or prime movers with varying torque properties. The torque-speed characteristic of this stator configuration of the calibrated slip direct current machine should allow the machine to operate at moderate speeds while undergoing moderate to severe load or prime mover torque-position disturbances.

Figure 2:
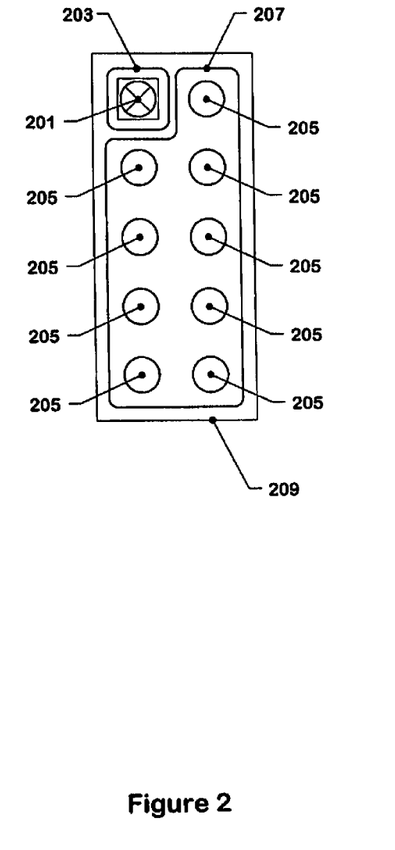
FIG. 2 illustrates a first slot of the calibrated slip Direct Current machine of the present invention.
Figure 3:
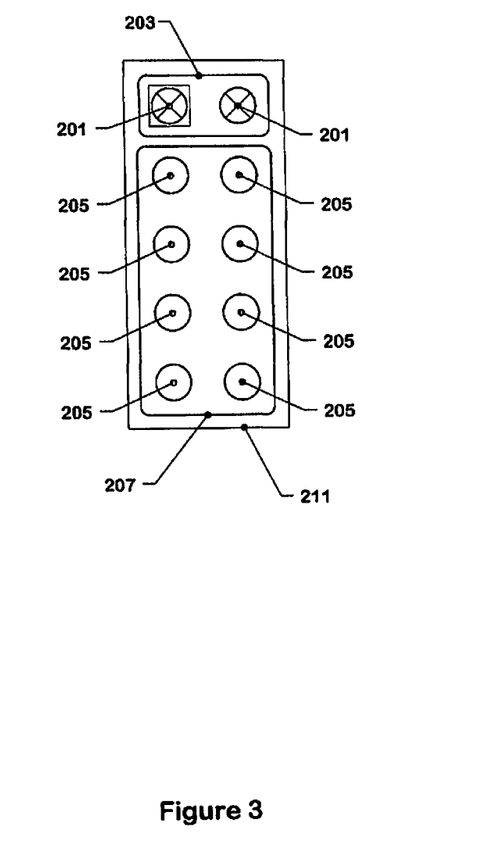
FIG. 3 illustrates a second slot of the calibrated slip Direct Current machine of the present invention.
Figure 4:
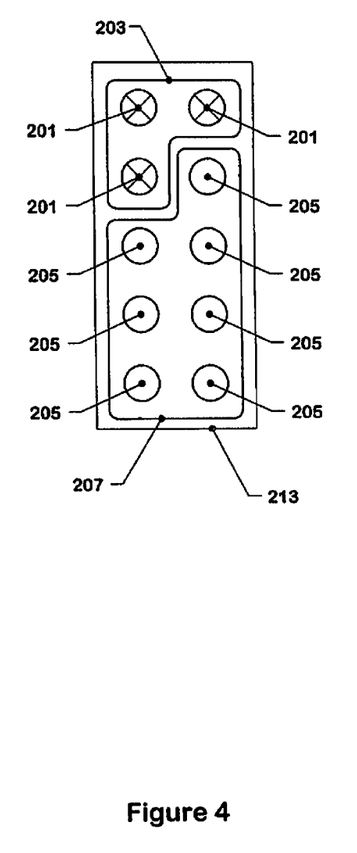
FIG. 4 illustrates a third slot of the calibrated slip Direct Current machine of the present invention.
Figure 5:
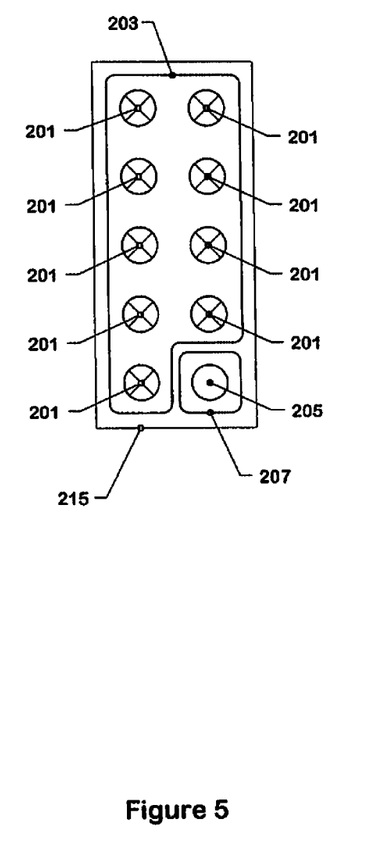
FIG. 5 illustrates a nineth slot of the calibrated slip Direct Current machine of the present invention.

For example, if the odd integer is selected as the odd integer nine (9) for a four-pole machine, the number of slots would be seventy-two (72) and the number of turns of windings 201, 205 passing through each slot could be ten (10). The first sequence 801 in stair step arrangement of the conductor/windings 201, 205 is to add a single first conductor 201 from winding group one 203 and reduce a single conductor 205 from winding group two 207 and to an adjacent slot starting with a single first conductor 201 from winding group 1 203 and nine second conductors 205 from winding group 2 207 until there is a single conductor 205 from group 2 207 and nine conductors 201 from group 1. For a seventy-two (72) slot rotor, Slot One (1) 209 as illustrated in FIG. 2 would have one (1) first conductor 201 positioned in the slot 209 from winding group one (1) 203 and nine (9) second conductors 205 positioned in the slot 209 from winding group two (2) 207. Slot Two (2) 211 would have two (2) first conductors 201 laid in the slot 211 from winding group one (1) 203 and eight (8) second conductors 205 positioned in the slot 211 from winding group two (2) 207. Slot Three (3) 213 would have three (3) conductors 201 positioned in the slot 213 from winding group one (1) 203 and seven (7) conductors 205 positioned in the slot 213 from winding group two (2) 207. The sequence in stair step arrangement would continue, Slot Nine (9) 215 would have nine (9) conductors 201 positioned in the slot 215 from winding group one (1) 203 and one (1) conductor 205 laid in the slot 215 from winding group two (2) 207. The second sequence 803 in stair step arrangement for the next nine slots is reversed with respect to the above description by reducing the conductors by a single conductor 201 from group 1 (1) 203 and increasing the conductors by a single conductor 205 from group 2 (two) 207 to start from nine conductors 201 from group number one 203 and one conductor 205 from group number two 207 until there are nine conductors 205 from group 2 207 and one conductor 201 from group 1 203. Slot Ten (10) would be wound the same way as Slot Nine (9) with current flowing in the opposite direction in winding group 2 207 and flowing in the same direction in winding group 1 203.

There are four rotor areas per winding group that are equally spaced. The four rotor steel pole center areas of Winding Group One are shifted ninety (90) electrical degrees with respect to the four rotor steel pole center areas of Winding Group Two (2) for this four (4) pole example. The rotor areas between Slots Nine (9) and Ten (10), between Slots Twenty-seven (27) and Twenty-eight (28), between Slots Forty-five (45) and Forty-six (46), and between Slots Sixty-three (63) and Sixty-four (64) are the centers of the four pole faces for Winding Group Two (2).

The rotor steel areas between Slot Seventy-two (72) and slot One (1), between Slots Eighteen (18) and Nineteen (19), between Slots Thirty-six (36) and Thirty-seven (37), and between Slots Fifty-four (54) and Fifty-five (55) are the centers of the four pole faces for Winding Group One (1). If Winding Group One (1) is energized through its slip rings with a specific per unit quantity X of current times the Cosine of the desired mmf vector angle k and Winding Group Two (2) is energized through its slip rings with approximately the same specific quantity Y of current times the Sine of the desired mmf vector angle k, the magnetic flux pattern will shift forward by the approximately the a predetermined mmf vector angle k from the zero degree location. Two control loops are established between the rotor shaft speed and position (one input), the machine terminal voltage or reactive power (another input) and the two current sources (two outputs) connected to two sets of slip rings to positively control and calibrate the slip of the rotor. This configuration not only allows the position of the rotor relative to the stator mmf wave to change, this configuration also allows the operation of the rotor at a specific speed with respect to the mmf wave speed of the stator.

The 72 rotor slot four pole machine example has 36 slots per pole set. The MMF pole distribution and pattern is approximately sinusoidal all of the way around the four pole faces.

The control circuit 102 is used to control the winding currents.

Figure 6:
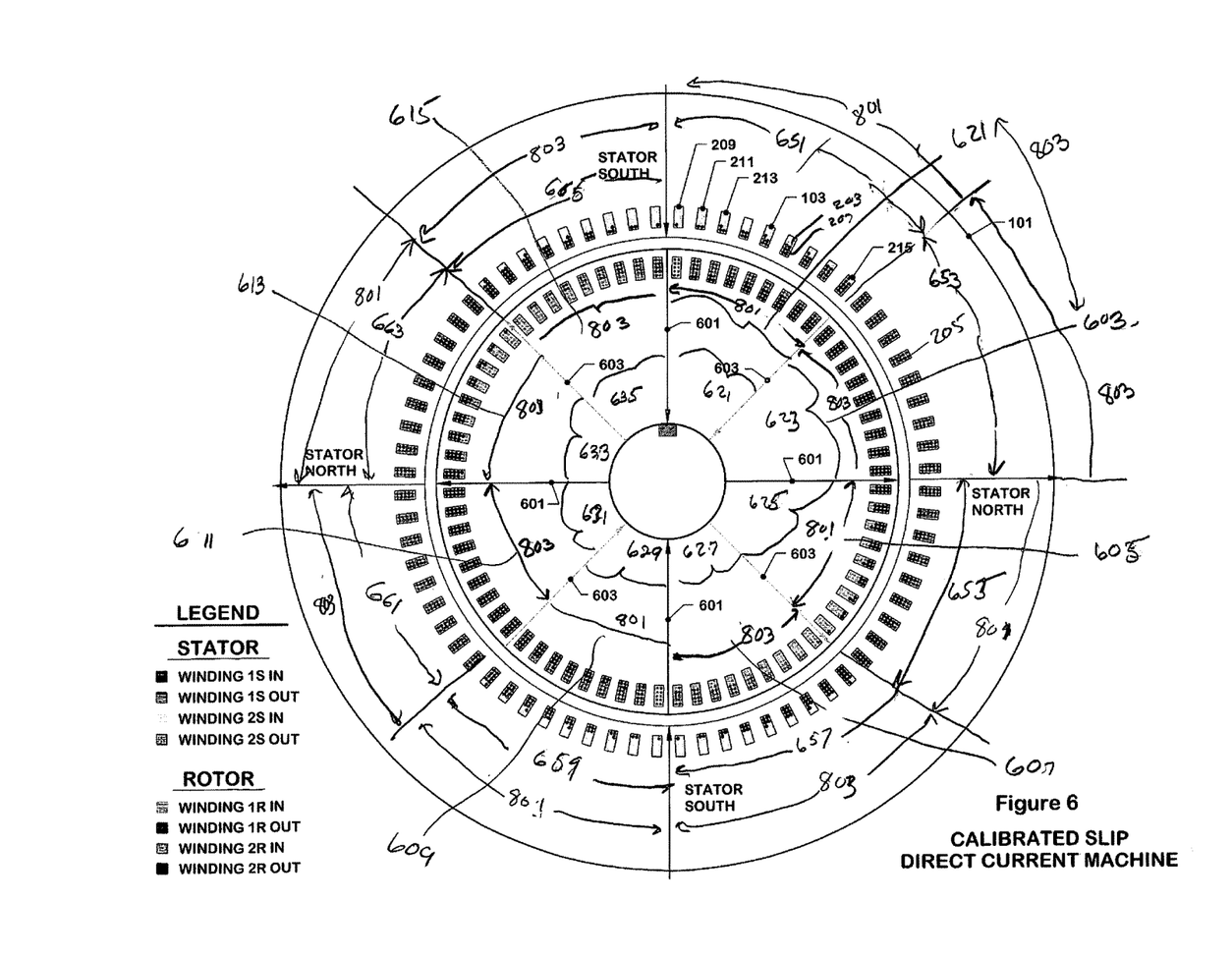
FIG. 6 illustrates a cross-sectional view of the stator and rotor of the calibrated slip Direct Current of the present invention.

The significance of the pole faces define where the direct and quadrature axes lie on the rotor. The characteristic of the direct and quadrature axes is for protection and control and to calculate the transfer of power across the air gap. For a four pole machine example, for winding 1 203 there would be two direct axes 601 and two quadrature axes 603 and for winding 2 207 again there would be two direct axes 603 and two quadrature axes 601. Under dynamic control you are moving a virtual set of direct and quadrature axes around the rotor face 103 which is a virtual movement as you project it and which is a real movement when you measure it.

Figure 7:
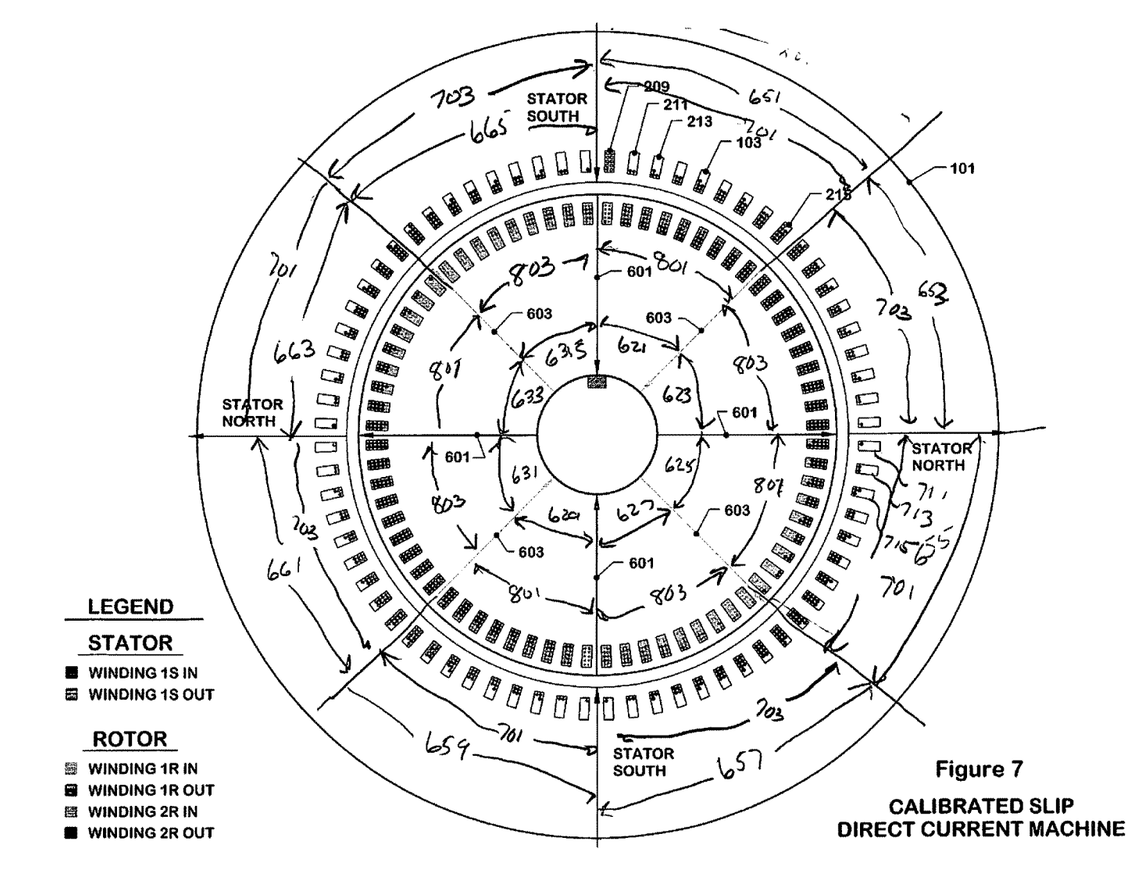
FIG. 7 illustrates a cross-sectional view of the stator and rotor of the calibrated slip Direct Current of the present invention.
Figure 9:
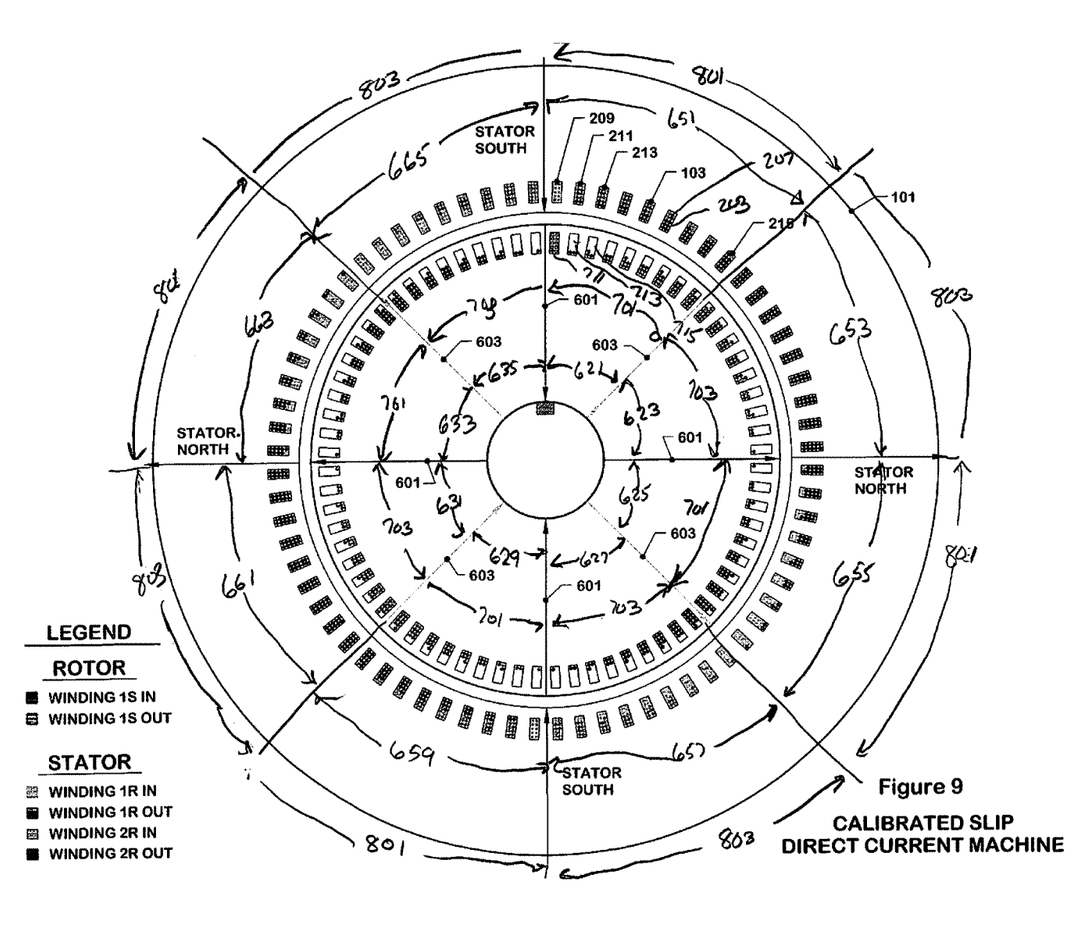
FIG. 9 illustrates a cross-sectional view of the stator and rotor of the calibrated slip Direct Current of the present invention.

FIG. 1 illustrates a control system for FIG. 7, FIG. 8 and FIG. 9 including a control circuit 102 for the calibrated slip DC machine 800 and of the present invention and illustrates a stator 101 which may extend around a rotor 103 which may cooperate with a shaft 105 which may rotate. The calibrated slip DC machine 800 may operate as a generator or may operate as a motor in accordance with the teachings of the present invention. The shaft 105 may be connected to a position sensor 121 which may be an optical wheel to provide an indication of the position such as the rotational position of the shaft and to provide an indication of the slip of the calibrated slip DC and machine 100. FIG. 1 additionally illustrates a control circuit for FIG. 7 and FIG. 8 which may include a first multiplier circuit 117 and a second multiplier circuit 119 which may be connected to slip rings 107 which may be positioned on the shaft 105 to connect to the first winding group and the second winding group respectively which may be positioned within the rotor 103. The control circuit for FIG. 9 and not shown on FIG. 1 may include a first multiplier circuit 117 and a second multiplier circuit 119 which may be connected to the stator which connect to the first winding group and the second winding group respectively which may be positioned within the stator 101, and the DC source may be connected to one winding group through one set of slip rings on the rotor. The desired position and slip of the rotor 103 and the output from the position and slip circuit 123 which provides the actual position and slip of the rotor 103 may be input to the summing circuit 113 which may calculate the difference between the two inputs. Alternatively, only one of these two inputs is referenced against desired while the other input may establish an operational bandwidth (set of boundaries). The slip quantity is the time derivative of position quantities and is calculated. When actual position with respect to time is referenced against desired, the error quantity of slip can be "tuned" to optimize controllability to the most narrow bandwidth possible before stability becomes compromised. When slip is referenced against desired, the error quantity of position can be "tuned" to optimize controllability before stability becomes compromised. This makes it possible to apply a soft yet directional starting torque to the rotor when operated as a motor. The output of the summing circuit 113 is input to the angle generator 109 to generate an angle based upon the desired position and desires slip. The magnitude of the desired excitation is input to the magnitude summing circuit 115 and the V where the symbol V may be the symbol for voltage is additionally input to the magnitude summing circuit 115. The output of the magnitude summing circuit 115 is input to the magnitude generating circuit 111 to generate a magnitude for the first multiplier circuit 117 and the second multiplier circuit 119, and the output of the angle generator 109 is input to the first multiplier circuit 117 and the second multiplier circuit 119. The first multiplier circuit 117 multiplies the magnitude by the cosine of the angle and the second multiplier circuit 119 multiplies the magnitude by the sine of the angle. The output of the first multiplier circuit 117 and the second multiplier circuit 119 is input to first winding group and the second winding group of the rotor 103 of FIG. 7 and FIG. 8, and of the stator 101 of FIG. 9.

FIG. 8 illustrates eight groups of rotor slot groups which may be substantially truncated pie shaped and extend around the outer peripheral edge of the rotor 103 and may include an equal number of slots. A first winding group may include the windings in the first group of rotor slots 621 and the windings in the second group of rotor slots 623. The first group of rotor slots 621 may be adjacent to the second group of rotor slots 623 and may be adjacent to the eighth group of rotor slots 635. A second winding group may include the winding in the third group of rotor slots 625 and the fourth group of rotor slots 627. The third group of rotor slots 625 may be adjacent to the second group of rotor slots 623 and may be adjacent to the fourth group of rotor slots 627; the first winding group may be repeated and may include the windings in the fifth group of rotor slots 629 and the six group of rotor slots 631; the fifth group of rotor slots 629 may be adjacent to the fourth group of rotor slots 627 and the sixth group of rotor slots 631 may be adjacent to the fifth group of rotor slots 629. The second winding group may be repeated and may include the seventh group of rotor slots 633 and the eighth group of rotor slots 635. The seventh group of rotor slots 633 may be adjacent to the sixth group of rotor slots 631 and may be adjacent to the eighth group of rotor slots 635.

The first group of rotor slots 621 may include the first sequence 801 in stair step arrangement of windings and the second group of rotor slots 623 may include the second sequence 803 in stair step arrangement of windings. The third group of rotor slots 625 may include the first sequence 801 in stair step arrangement of windings. The fourth group of rotor slots 627 may include the second sequence 803 in stair step arrangement. The fifth group of rotor slots 629 may include the first sequence 801 in stair step arrangement of windings and the six group of rotor slots 631 may include the second sequence 803 in stair step arrangement of windings. The seventh group of rotor slots 633 may include the first sequence 801 in stair step arrangement of windings and the eighth group of rotor slots 635 may include the second sequence 803 in stair step arrangement of the windings. The stator 101 may include only the first conductor 201.

FIG. 6 illustrates eight groups of rotor slot groups which may be substantially truncated pie shaped and extend around the outer peripheral edge of the rotor 103 and may include an equal number of slots. A first winding group may include the windings in the first group of rotor slots 621 and the windings in the second group of rotor slots 623. The first group of rotor slots 621 may be adjacent to the second group of rotor slots 623 and may be adjacent to the eighth group of rotor slots 635. A second winding group may include the winding in the third group of rotor slots 625 and the fourth group of rotor slots 627. The third group of rotor slots 625 may be adjacent to the second group of rotor slots 623 and may be adjacent to the fourth group of rotor slots 627; the first winding group may be repeated and may include the windings in the fifth group of rotor slots 629 and the six group of rotor slots 631; the fifth group of rotor slots 629 may be adjacent to the fourth group of rotor slots 627 and the sixth group of rotor slots 631 may be adjacent to the fifth group of rotor slots 629. The second winding group may be repeated and may include the seventh group of rotor slots 633 and the eighth group of rotor slots 635. The seventh group of rotor slots 633 may be adjacent to the sixth group of rotor slots 631 and may be adjacent to the eighth group of rotor slots 635.

The first group of rotor slots 621 may include the first sequence 801 in stair step arrangement of windings and the second group of rotor slots 623 may include the second sequence 803 in stair step arrangement of windings. The third group of rotor slots 625 may include the first sequence 801 in stair step arrangement of windings. The fourth group of rotor slots 627 may include the second sequence 803 in stair step arrangement. The fifth group of rotor slots 629 may include the first sequence 801 in stair step arrangement of windings and the six group of rotor slots 631 may include the second sequence 803 in stair step arrangement of windings. The seventh group of rotor slots 633 may include the first sequence 801 in stair step arrangement of windings and the eighth group of rotor slots 635 may include the second sequence 803 in stair step arrangement of the windings.

FIG. 6 additionally illustrates eight groups of stator slot groups which may be substantially truncated pie shaped and extend around the inner peripheral edge of the rotor 103 and may include an equal number of slots.

FIG. 6 illustrates a first group of stator slots 651 which may be adjacent to an eight group of stator slots 665 and adjacent to a second group of stator slots 653 and illustrates a third group of stator slots 655 which may be adjacent to the second group of stator slots 653 and which may be adjacent to a fourth group of stator slots 657. A fifth group of stator slots 659 may be adjacent to the fourth group of stator slots 657 and may be adjacent to a sixth group of stator slots 661. A seventh group of stator slots numerals 663 may be adjacent to the sixth group of stator slots 661 and may be adjacent to the eighth group of stator slots 665.

A third winding group may include the windings in the first group of stator slots 651 and the windings in the second group of stator slots 653. The first group of stator slots 651 may include the first sequence 801 in stair step arrangement of windings and the second group of stator slots 653 may include the second sequence 803 in stair step arrangement of windings. A fourth winding group may include windings in the third group of stator slots 655 and the fourth group of stator slots 657. The third group of stator slots 655 may include the first sequence 801 of windings. The fourth group of stator slots 657 may include the second sequence 803 in stair step arrangement of the windings and the fifth group of stator slots 659 may include the first sequence 801 in stair step arrangement of windings. The fifth group of stator slots 659 may include the first sequence 801 in stair step arrangement of windings, and the six groups of stator slots 661 may include the second sequence 803 in stair step arrangement of windings. The seventh group of stator slots 663 may include the first sequence 801 in stair step arrangement of windings, and the eighth group of stator slots 665 may include the second sequence 803 in stair step arrangement of windings.

FIG. 7 illustrates eight groups of rotor slot groups which may be substantially truncated pie shaped and extend around the outer peripheral edge of the rotor 103 and may include an equal number of slots. A first winding group may include the windings in the first group of rotor slots 621 and the windings in the second group of rotor slots 623. The first group of rotor slots 621 may be adjacent to the second group of rotor slots 623 and may be adjacent to the eighth group of rotor slots 635. A second winding group may include the winding in the third group of rotor slots 625 and the fourth group of rotor slots 627. The third group of rotor slots 625 may be adjacent to the second group of rotor slots 623 and may be adjacent to the fourth group of rotor slots 627; the first winding group may be repeated and may include the windings in the fifth group of rotor slots 629 and the six group of rotor slots 631; the fifth group of rotor slots 629 may be adjacent to the fourth group of rotor slots 627 and the sixth group of rotor slots 631 may be adjacent to the fifth group of rotor slots 629. The second winding group may be repeated and may include the seventh group of rotor slots 633 and the eighth group of rotor slots 635. The seventh group of rotor slots 633 may be adjacent to the sixth group of rotor slots 631 and may be adjacent to the eighth group of rotor slots 635.

The first group of rotor slots 621 may include the first sequence 801 in stair step arrangement of windings and the second group of rotor slots 623 may include the second sequence 803 in stair step arrangement of windings. The third group of rotor slots 625 may include the first sequence 801 in stair step arrangement of windings. The fourth group of rotor slots 627 may include the second sequence 803 in stair step arrangement. The fifth group of rotor slots 629 may include the first sequence 801 in stair step arrangement of windings and the six group of rotor slots 631 may include the second sequence 803 in stair step arrangement of windings. The seventh group of rotor slots 633 may include the first sequence 801 in stair step arrangement of windings and the eighth group of rotor slots 635 may include the second sequence 803 in stair step arrangement of the windings. The stator 101 may include only the first conductor 201.

FIG. 7 illustrates a first group of stator slots 651 which may be adjacent to an eight group of stator slots 665 and adjacent to a second group of stator slots 653 and illustrates a third group of stator slots 655 which may be adjacent to the second group of stator slots 653 and which may be adjacent to a fourth group of stator slots 657. A fifth group of stator slots 659 may be adjacent to the fourth group of stator slots 657 and may be adjacent to a sixth group of stator slots 661. A seventh group of stator slots numerals 663 may be adjacent to the sixth group of stator slots 661 and may be adjacent to the eighth group of stator slots 665.

FIG. 7 illustrates two sequences 701 703 of a single winding sequence which may be formed in stair step arrangement which may be that the slot may only include a single conductor. Similar to the sequences 801 and 803 the change in the number of conductors either increases or decreases by a single conductor. For example, the slot 711 may have sufficient space for 10 conductors but actually may have only one conductor. Slot 713 which may be directly adjacent to slot 711 may have only two conductors of the same winding group, and slot 715 which may be directly adjacent to slot 713 may have three conductors of the same winding group. The sequence 701 continues until the slot is filled with 9 conductors. A second sequence 703 follows the sequence 701 where the conductors may be removed from the slot, starting with a completely filled slot of conductors, one by one until the slot is left with a single conductor. Sequence 701 may begin again. Slot sizes may be formed in different sizes to accommodate conductor quantity.

The first group of stator slots 651, the third group of stator slots 655, the fifth group of stator are slots 659 and the seventh group of stator slots 663 may follow the single winding first sequence 701 in stair step arrangement.

The second group of stator slots 653, the fourth group of stator slots 657, the sixth group of stator are slots 661 and the eight group of stator slots 665 may follow the single winding second sequence 703 to in stair step arrangement.

FIG. 9 additionally illustrates eight groups of stator slot groups which may be substantially truncated pie shaped and extend around the inner peripheral edge of the rotor 103 and may include an equal number of slots.

FIG. 9 illustrates a first group of stator slots 651 which may be adjacent to an eighth group of stator slots 665 and adjacent to a second group of stator slots 653 and illustrates a third group of stator slots 655 which may be adjacent to the second group of stator slots 653 and which may be adjacent to a fourth group of stator slots 657. A fifth group of stator slots 659 may be adjacent to the fourth group of stator slots 657 and may be adjacent to a sixth group of stator slots 661. A seventh group of stator slots numerals 663 may be adjacent to the sixth group of stator slots 661 and may be adjacent to the eighth group of stator slots 665.

The first group of stator slots 651 may include the first sequence 801 in stair step arrangement of windings and the second group of stator slots 653 may the second sequence 803 in stair step arrangement of windings, and the third group of stator slots 655 may include the first sequence 801 in stair step arrangement of windings of windings. The fourth group of stator slots 657 may include the second sequence 803 in stair step arrangement of the windings and the fifth group of stator slots 659 may include the first sequence 801 in stair step arrangement of windings, the the sixth group of stator slots 661 may include second sequence 803 in stair step arrangement of the windings. The seventh group of stator slots 663 may include the first sequence 801 in stair step arrangement of windings, and the eighth group of stator slots 665 may include the second sequence 803 in stair step arrangement of windings.

FIG. 9 illustrates eight groups of rotor slot groups which may be substantially truncated pie shaped and extend around the outer peripheral edge of the rotor 103 and may include an equal number of slots. The first group of rotor slots 621 may be adjacent to the second group of rotor slots 623 and may be adjacent to the eighth group of rotor slots 635. The third group of rotor slots 625 may be adjacent to the second group of rotor slots 623 and may be adjacent to the fourth group of rotor slots 627; the fifth group of rotor slots 629 may be adjacent to the fourth group of rotor slots 627 and the sixth group of rotor slots 631. The seventh group of rotor slots 633 may be adjacent to the sixth group of rotor slots 631 and may be adjacent to the eighth group of rotor slots 635.

FIG. 9 illustrates two sequences 701 703 of a single winding sequence which may be formed in stair step arrangement which may be that the slot may only include a single conductor. Similar to the sequences 801 and 803, the change in the number of conductors either increases or decreases by a single conductor. For example, the slot 711 may have sufficient space for 10 conductors but actually may have only one conductor. Slot 713 which may be directly adjacent to slot 711 may have only two conductors of the same winding group, and slot 715 which may be directly adjacent to slot 713 may have three conductors of the same winding group. The sequence 701 continues until the slot is filled with 9 conductors. A second sequence 703 follows the sequence 701 where the conductors may be removed from the slot, starting with a completely filled slot of conductors, one by one until the slot is left with a single conductor. Sequence 701 may begin again. Slots may be formed in different sizes to accommodate conductor quantity with consideration given to rotor mechanical balance.

The first group of stator slots 651, the third group of stator slots 655, the fifth group of stator are slots 659 and the seventh group of stator slots 663 may follow the single winding first sequence 801 in stair step arrangement.

The second group of stator slots 653, the fourth group of stator slots 657, the sixth group of stator are slots 661 and the eight group of stator slots 665 may follow the single winding second sequence 803 to in stair step arrangement.

As in FIG. 7, one winding group in round stator configuration about the stator may be illustrated and, the calibrated slip rotor can be utilized. Specifically for the stator, there is one winding group distributed around the stator face. This winding group is laid in the slots in stair step fashion. This winding group is connected to a direct current source. This stair stepped slot configuration distributes an approximate sinusoidal mmf wave around the stator when it is connected to a direct current source. For the rotor as illustrated in FIG. 7, there are at least two winding groups distributed around the rotor face. Each winding group is energized by its own set of slip rings. Each winding group is laid in the slots in stair step fashion. It is most advantageous for the number of slots on the rotor to be two times the number of poles times any odd integer that is greater than one. It is most advantageous for the number of turns in each slot is any integral multiple of this odd integer plus one (1). The two winding groups should be continuously stair stepped with respect to each other as you move from slot to slot around the rotor face. This configuration may distribute the approximate sinusoidal mmf wave around the rotor for any given desired mmf pole position angle, and this configuration may aid in mechanically balance the rotor. The sinusoidal distributed mmf wave transitions mostly the fundamental wave pattern of this sinusoidal magnetic field intensity of the rotor face into the air gap which forms the distributed magnetic flux density patterns through the air gap across to a sinusoidal distributed mmf stator face. The torque-speed characteristic of this stator configuration of the calibrated slip direct current machine should allow the machine to operate at moderate speeds while undergoing moderate to severe load or prime mover torque-position disturbances.

The DC machine illustrated in FIG. 6 may provide virtual pole displacement on both stator and rotor, and the DC machine may run the rotor at a fast speed with high torque. In addition, the machine can function as a motor.

The DC machine illustrated in FIG. 7 may include fixed poles on the stator and may provide virtual pole displacement on the rotor. Consequently, the rotor may be larger in diameter. The DC machine of FIG. 7 may be used in applications requiring a higher torque and a lower speed. The DC machine of FIG. 7 may function as a motor or a generator.

The DC machine illustrated in FIG. 9 may include fixed poles on the rotor, and consequently the rotor may be smaller in diameter. The DC machine FIG. 9 may include virtual pole placement on the stator and may be useful in applications with high speed and low torque is desired. The DC machine of FIG. 9 may operate as a motor or generator.

FIG. 6, FIG. 7 and FIG. 9 depict both rotor and stator winding distributions that project nearly-pure sinusoidal distributed magnetic field intensity across each pole face. This not only should reduce the transfer of class 2 energy (a non-electromechanical energy conversion like heat) across the air gap; more importantly, it allows nearly 100% of this precious air gap real estate to be utilized for the transfer of class 1 energy (electromechanical energy conversion).

Both FIGS. 6 and 7 illustrates a rotor that has two winding groups which allow the controller to virtually direct the vectors and magnitudes of the rotor poles with respect to a reference on the rotor axle.

FIG. 6 illustrates a stator that also has two winding groups which allows the controller to virtually direct the vectors and magnitudes of the stator poles with respect to a fixed reference on the stator steel. The advantage of this machine is that it should be able to operate at angular velocities, both clockwise and anti-clockwise, over a wide range of speed magnitudes accurately controlled by the controller within the limits of the machine and the controller. This machine can be operated in motor mode.

FIG. 7 illustrates a stator that may only have one winding group which allows the controller to virtually direct only the magnitudes of the stator poles while maintaining fixed vectors with respect to a fixed reference on the stator steel. The advantage of this machine is that this DC machine should be able to operate at angular velocities, both clockwise and anti-clockwise, over a more limited range of speed magnitudes accurately controlled by the controller within the limits of the machine and the controller. This machine can be operated in motor or generator mode.

FIG. 9 illustrates a rotor that may only have one winding group which allows the controller to virtually direct only the magnitudes of the rotor poles while maintaining fixed vectors with respect to a fixed reference on the rotor axle. The advantage of this DC machine may be having torque-speed characteristics of higher speeds and lower torque. This machine can be operated in motor or generator mode.

Figure 10:
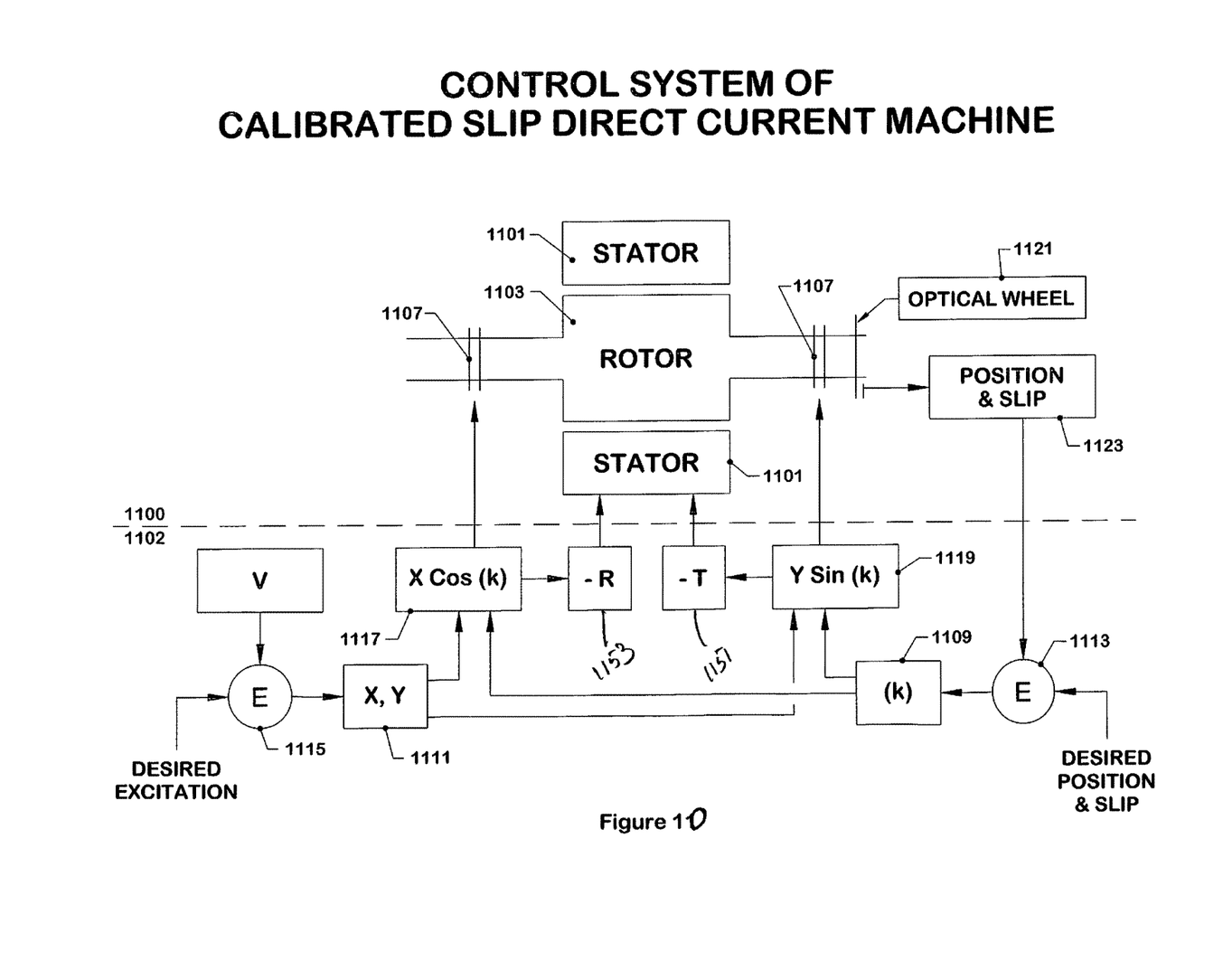
FIG. 10 illustrates another control circuit of the present invention.

FIG. 10 illustrates another control system which may control the circuit of FIG. 6 and which may include a control circuit 1102 for the calibrated slip DC machine and of the present invention and illustrates a stator 1101 which may extend around a rotor 1103 which may cooperate with a shaft 1105 which may rotate. The calibrated slip DC machine may operate as a motor in accordance with the teachings of the present invention. The shaft 1105 may be connected to a position sensor 1121 which may be an optical wheel to provide an indication of the position such as the rotational position of the shaft and to provide an indication of the slip of the calibrated slip DC machine and. FIG. 10 additionally illustrates a first multiplier circuit 1117 and a second multiplier circuit 1119 which may be connected to slip rings 1107 which may be positioned on the shaft 1105 to connect to the first winding group and the second wiring group respectively which may be positioned within the rotor 1103. The desired position and slip of the rotor 1103 and the output from the position and slip circuit 1123 which provides the actual position and slip of the rotor 1103 may be input to the summing circuit 1113 which may calculate the difference between the two inputs. Alternatively, only one of these two inputs is referenced against desired while the other input may establish an operational bandwidth (set of boundaries). The slip quantity is the time derivative of position quantities and is calculated. When actual position with respect to time is referenced against desired, the error quantity of slip can be "tuned" to optimize controllability to the most narrow bandwidth possible before stability becomes compromised. When slip is referenced against desired, the error quantity of position can be "tuned" to optimize controllability before stability becomes compromised. This makes it possible to apply a soft yet directional starting torque to the rotor when operated as a motor. The output of the summing circuit 1113 is input to the angle generator 1109 to generate an angle based upon the desired position and desired slip. The magnitude of the desired excitation is input to the magnitude summing circuit 1115 and the voltage V is additionally input to the magnitude summing circuit 1115. The output of the magnitude summing circuit 1115 is input to the magnitude generating circuit 1111 to generate a magnitude for the first multiplier circuit 1117 and the second multiplier circuit 1119, and the output of the angle generator 1109 is input to the first multiplier circuit 1117 and the second multiplier circuit 1119. The first multiplier circuit 1117 multiplies the magnitude by the cosine of the angle and the second multiplier circuit 1119 multiplies the magnitude by the sine of the angle. The output of the first multiplier circuit 1119 and the second multiplier circuit 1119 is input to first winding group and the second winding group of the rotor 1103. The control circuit as shown in FIG. 10 may include a third multiplier circuit 1153 to multiply by −R where R is a constant and fourth multiplier circuit 1151 to multiplied by −T where T is a constant. Both the output from the third multiplier circuit 1153 and the fourth multiplier circuit 1511 are connected to the stator 1101, and the input to the third multiplier circuit 1153 and the fourth multiplier circuit 1151 are connected to the cosine multiplier circuit 1117 and the sine multiplier circuit 1119.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A direct current machine for connection to an electrical system, comprising:
   a stator configured as a portion of the direct current machine;
   a rotor configured as a portion of the direct current being rotatable with respect to the stator;
   a control circuit to control the rotor to control a magnetomotive force (mmf) vector about a face of the rotor; and
   wherein the direct current machine includes a first winding group and a second winding group, wherein the first winding group includes at least one first conductor and the second winding group includes at least one second conductor and wherein the first conductor and the second conductor are configured in a stair step configuration from slot to slot and wherein the stair step configuration includes a first slot and a second slot and wherein the first slot and the second slot directly adjacent to the first slot includes both first conductor and the second conductor, wherein the difference in number between the first conductor in the first slot and the first conductor in the second slot is a single first conductor.

2. A direct current machine for connection to an electrical system as in claim 1, wherein the difference between the second conductor in the first slot and the second conductor in the second slot is a single second conductor.

3. A direct current machine for connection to an electrical system as in claim 1, wherein the control circuit includes an angle generator to determine the angle of slip between the rotor and the stator.

4. A direct current machine for connection to an electrical system as in claim 1, wherein the control circuit includes a magnitude generator to generate a magnitude of magnetic flux density between the rotor and the stator.

5. A direct current machine for connection to an electrical system as in claim 1, wherein the control circuit includes an angle summing circuit.

6. A direct current machine for connection to an electrical system as in claim 1, wherein the control circuit includes a magnitude summing circuit.

7. A direct current machine for connection to an electrical system as in claim 1, wherein the control circuit includes a first multiplier circuit to connect to the rotor or to the stator or to both.

8. A direct current machine for connection to an electrical system as in claim 1, wherein the control circuit includes a second multiplier circuit to connect to the rotor or to the stator or to both.

9. A direct current machine for connection to an electrical system as in claim 1, wherein the control circuit to control the rotor or stator or both to control a magnitude of the magnetomotive force (mmf) vector about the face of the rotor or about the face of the stator or about the faces of both.

10. A direct current machine for connection to an electrical system as in claim 1, wherein the control circuit to control an angle of the magnetomotive force (mmf) vector about the face of the rotor or about the face of the stator or about the faces of both.

11. A direct current machine for connection to an electrical system as in claim 1, wherein the stator comprises the first and second winding groups.

* * * * *